United States Patent [19]

Benker et al.

[11] 4,386,817
[45] Jun. 7, 1983

[54] CABLE UNDERPINNING

[75] Inventors: Horst Benker, Heilbronn; Lienhard Plensat; Gernot Kratzer, both of Ostfildern, all of Fed. Rep. of Germany

[73] Assignee: Richard Hirschmann, Radiotechnisches Werk, Esslingen, Fed. Rep. of Germany

[21] Appl. No.: 218,946

[22] Filed: Dec. 22, 1980

[30] Foreign Application Priority Data

Dec. 21, 1979 [DE] Fed. Rep. of Germany ... 7936017[U]

[51] Int. Cl.³ .......................................... H01R 13/58
[52] U.S. Cl. ................................................ 339/103 B
[58] Field of Search ........... 339/103 R, 103 B, 103 C; 174/153 G

[56] References Cited

U.S. PATENT DOCUMENTS

| | | | |
|---|---|---|---|
| 2,420,826 | 5/1947 | Irrgang | 339/103 B X |
| 3,744,008 | 7/1973 | Castellani | 339/103 B X |
| 4,033,535 | 7/1977 | Moran | 339/103 B X |
| 4,089,496 | 5/1978 | Mizusawa | 339/103 B X |

*Primary Examiner*—Eugene F. Desmond
*Attorney, Agent, or Firm*—Karl F. Ross; Herbert Dubno

[57] ABSTRACT

A cable underpinning usable, for example in spark-plug assemblies, comprises a pipe stub connected to a spark-plug housing and a deformable sleeve provided with a plurality of longitudinal slits or apertures. The pipe stub has a first inner cylindrical surface connected by means of a frusto-conical surface to a second inner cylindrical surface which is smaller in diameter than the surface of the sleeve when the same is in an unstressed or uncompressed state, the second cylindrical surface being provided with a plurality of sharp-edged recesses. Upon the passing of the cable through the sleeve and the force-fit insertion of the sleeve into the pipe stub, bulges are formed in the sleeve which protrude into the recesses, thereby preventing rotary and axial motion of the sleeve relative to the pipe stub. The flexible outer layer of the cable also bulges into the slits, which bulging locks the cable to the sleeve. The sleeve is provided on an inner surface with annular projections which bite into the cable sheath upon the force-fit insertion of the sleeve and cable into the pipe stub.

4 Claims, 4 Drawing Figures

CABLE UNDERPINNING

FIELD OF THE INVENTION

Our present invention relates to an underpinning for an electrical cable, particularly useful in spark-plug assemblies.

BACKGROUND OF THE INVENTION

Underpinnings for securing electrical cables with plastic or rubber insulating sheaths to housings of spark-plug assemblies frequently include a rubber ring which is traversed by the cable and inserted in a cable inlet in the form of a pipe stub. A screw mounted in this pipe connector compresses the ring, whereby the same attains a friction lock with the cable and the pipe connector. Although the compressed rubber ring has proven to be effective in preventing relative rotation and axial motion of the cable and the pipe in many applications, increased load conditions have given rise to a need for a stronger and more secure underpinning assembly. Another disadvantage of the underpinnings using a rubber clamping and sealing ring is a high cost due to production and assembly of many components.

OBJECTS OF THE INVENTION

An object of our present invention is to provide an improved cable underpinning which is inexpensive to produce and assemble.

A more particular object of our present invention is to provide such an underpinning which has a minimum of parts.

Another object of our present invention is to provide such an underpinning which is capable of withstanding relatively high torques and axial loads.

Yet another object of our present invention is to provide such an underpinning which exhibits a fluid-tight seal.

SUMMARY OF THE INVENTION

A cable underpinning usable, for example, in spark-plug assemblies comprises according to our present invention, an electrical cable having a flexible sheath, a housing, a cable inlet in the form of a pipe stub connected to the housing and provided on an inner surface with at least one recess, and a deformable substantially sleeve-shaped clamping member provided with a longitudinal slit for lockingly engaging the cable sheath upon a force-fit insertion of the clamping sleeve into the pipe stub. The sleeve has an outwardly projecting portion or bulge which is formed upon the force-fit insertion of the sleeve into the pipe stub and which protrudes into the recess in the stub inner surface, whereby rotation and axial motion of the sleeve relative to the pipe stub is prevented. The stub has an inner diameter smaller than a corresponding outer diameter of the sleeve in an unstressed state thereof, the sleeve being clamped to the sheath upon force-fit insertion of the sleeve into the pipe stub.

According to another feature of our present invention, the pipe stub has, at an end spaced from the housing, a first cylindrical inner surface having a diameter substantially equal to the outer diameter of the sleeve in an unstressed state thereof. Between the first cylindrical surface and the housing the pipe stub is provided with a second cylindrical inner surface having a diameter smaller than the outer sleeve diameter in an unstressed state of the sleeve. The cylindrical inner stub surfaces are are connected by a frusto-conical surface, the sleeve including on its inner surface a projection located substantially in the region of the frusto-conical stub surface upon the force-fit insertion of the sleeve and cable into the pipe stub. Preferably, the inner surface of the sleeve bears a plurality of annular projections which are located in the region of the frusto-conical surface upon the force-fit assembly of the sleeve and the pipe stub, each such annular projection having a triangular cross-section.

According to further features of our present invention, the recess in the pipe stub has sharp edges and the inner surface of the sleeve is funnel-shaped at one end to facilitate the insertion of the cable into the clamping member and to inhibit damage to the cable sheath upon bending of the cable at the underpinning.

A cable underpinning according to our present invention comprises a minimum of components and is, therefore, inexpensive to manufacture and assemble. The clamping of the sleeve between the pipe stub and the cable sheath forms a fluid-tight seal and concomitantly increases friction forces tending to prevent the relative rotation and axial motion of the cable, the sleeve and stub. The slit or slits in the sleeve serve the dual function of facilitating the compression of the sleeve upon the insertion thereof, together with the cable, into the pipe stub and of cooperating with bulges in the cable sheath to lock the cable against rotation.

BRIEF DESCRIPTION OF THE DRAWING

These and other features and advantages of our present invention will now be described in detail, reference being made to the accompanying drawing in which.

SPECIFIC DESCRIPTION

Figure 1:
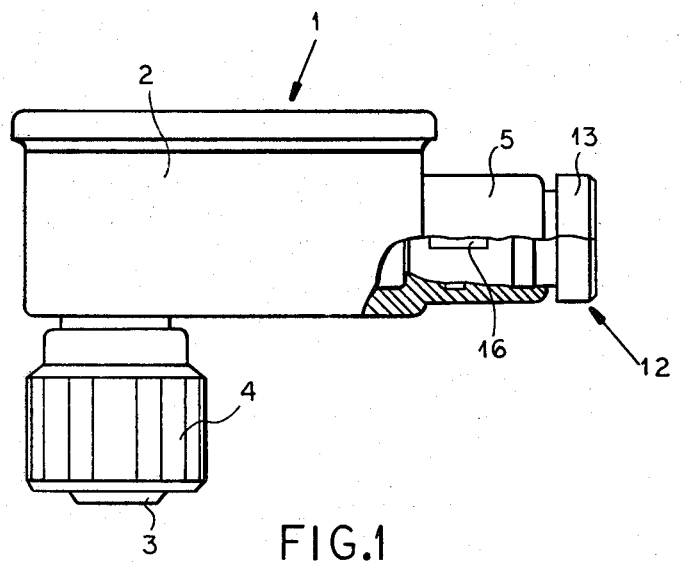
FIG. 1 is a side elevational view, partly broken away, of a spark-plug assembly incorporating a cable underpinning according to our present invention, showing a cable inlet in the form of a pipe stub and a clamping sleeve.

As illustrated in FIG. 1 a spark-plug assembly 1 comprises a housing 2, a contact insert 3, a nut 4 for fastening the assembly to a socket (not shown), and a cable underpinning including a pipe stub or connector 5 rigid with the housing. An electrical cable 6 (see FIGS. 3 and 4) carrying four wires 22 surrounded by a flexible plastic sheath 7 traverses pipe stub 5 and is mounted therein by means of a deformable substantially sleeve-shaped clamping member 12.

Figure 2:
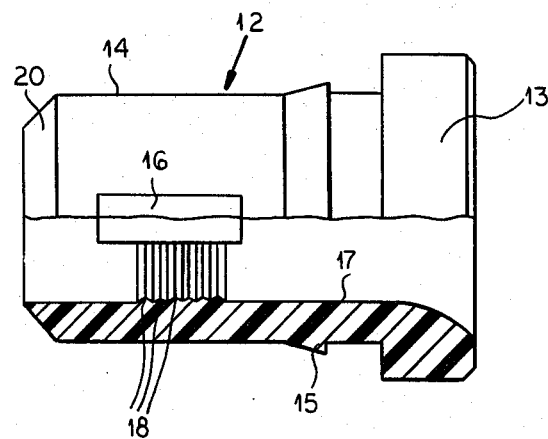
FIG. 2 is a side elevational view, partly broken away, of the sleeve shown in FIG. 1.
Figure 3:
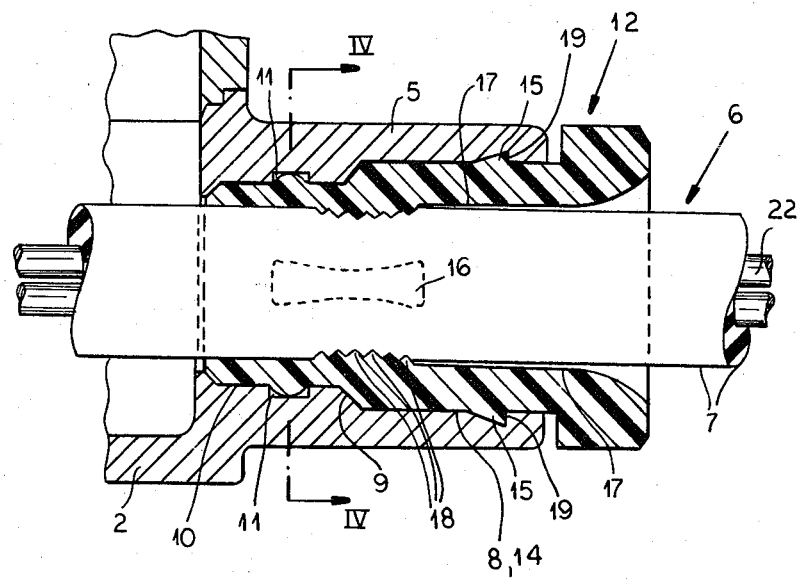
FIG. 3 is a cross-sectional view of the pipe stub and sleeve of FIG. 1, showing a cable traversing the sleeve and a deformed state thereof in the assembled underpinning.
Figure 4:
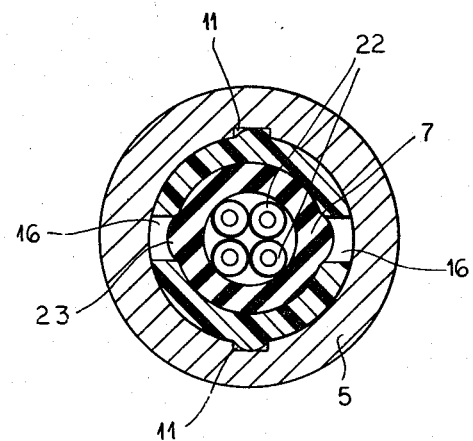
FIG. 4 is a cross-sectional view taken along line IV—IV in FIG. 3.

As shown in FIG. 2, clamping sleeve 12 has a cylindrical outer surface 14 formed at one end with a beveled edge or frusto-conical surface 20 and at an opposite end with a flange 13. Sleeve 12 is further provided with a pair of longitudinally extending slits 16 and, on outer surface 14, with an annular shoulder 15 serving as a detent or latch, as described in detail hereinafter with reference to FIG. 3. Sleeve 12 has a cylindrical inner surface 17 with a diameter substantially equal to, but preferably slightly greater than, the outer diameter of cable sheath 7. Inner surface 17 is formed, in the region of slits 16, with a plurality of annular heads or projections 18 substantially triangular or wedge-shaped in cross-section. As shown in FIGS. 2 and 3, inner surface 17 assumes a funnel-like shape at an outer end of sleeve 12, i.e, in the region of flange 13.

The funnel-shaped mouth of member 12 facilitates the insertion of cable 6 into the clamping member 12 during assembly of a cable underpinning according to our present invention. Upon the slipping of sleeve 12 around sheath 7, the sleeve is force-fitted or inserted into pipe stub 5 by means of a hand press or gripper tongs (not shown). As illustrated in FIG. 3, pipe 5 is formed at an end spaced from housing 2 with a first cylindrical inner surface having a diameter substantially equal to the outer diameter of the clamping sleeve 12. Between this first cylindrical inner surface and housing 2, pipe 5 is provided with a second cylindrical inner surface 10 having a diameter which is smaller than the diameter of sleeve surface 14 in an unstressed state of clamping member 12. Surface 10 is interrupted by a pair of sharp-edged recesses 11 into which respective portions of sleeve 12 project or bulge upon the force-fit insertion of sleeve 12 into pipe stub 5. The protrusion of sleeve 12 into recesses 11 serves to prevent rotation and axial motion of the clamping member relative to the pipe connector and the housing 2.

Cylindrical inner surfaces 8 and 10 are connected by a frusto-conical surface 9, while surface 8 is formed with an annular recess of the same shape and size as ring projection 15 (see FIG. 2), this recess being in part defined by an annular shoulder 19 which coacts with projection 15, in a snap-lock fit thereof, to prevent a withdrawal of cable 6 and sleeve 12 from pipe connector 5.

Upon insertion of sleeve 12 into pipe connector 5, the frusto-conical surface 9 converts axial forces into inward radial forces which compress sleeve 12 against sheath 7. As illustrated in FIG. 3, annular projections 18 are disposed on inner surface 17 in the region of frusto-conical surface 9 upon completed insertion of the clamping sleeve into the pipe stub. This disposition of ring projections 18 facilitates their biting into sheath 7 and consequently ensures an axial locking of cable 6 to sleeve 12. Rotation of cable 6 relative to sleeve 12 and pipe connector 5 is inhibited by the formation of bulges 23 (see FIG. 4) in sheath 7 which project into slits 16. As indicated by dashed line in FIG. 3, slits 16 have the auxiliary function of increasing the deformability of sleeve 12, thereby facilitating the insertion thereof into pipe stub 5.

Flange 13 serves to limit the amount sleeve 12 can be inserted into pipe stub 5, while the funnel-shaped mouth of member 12 inhibits damage to sheath 7 upon bending of cable 6 at the underpinning.

We claim:

1. A cable underpinning comprising:
   an electrical cable having a flexible sheath;
   a housing;
   a cable inlet in the form of a pipe stub connected to said housing and provided on an inner surface with at least one recess; and
   a deformable circumferentially continuous sleeve-shaped clamping member provided with gripping means including at least one longitudinally extending slit-shaped window bounded at its ends for lockingly engaging said sheath upon a force-fit insertion of said member into said stub, said clamping member having an outwardly projecting portion protruding into said recess upon said force-fit insertion, whereby rotation and axial motion of said member relative to said stub is prevented, said stub having an inner diameter smaller than a corresponding outer diameter of said member in an unstressed state thereof, whereby said member is clamped to said sheath upon said force-fit insertion, said stub having at an end spaced from said housing a first cylindrical inner surface having a diameter substantially equal to the outer diameter of said member in an unstressed state thereof, said stub being provided between said first cylindrical surface and said housing with a second cylindrical surface having a diameter smaller than the outer diameter of said member in an unstressed state thereof, said cylindrical surfaces being connected by a frusto-conical surface, said gripping means including on an inner surface of said member an arcuate projection disposed substantially at said window and in the region of said frusto-conical surface upon said force-fit insertion whereby said frusto-conical surface drives said sheath partly into said window and said projection into said sheath.

2. The underpinning defined in claim 1 wherein said gripping means includes on the inner surface of said member a plurality of arcuate projections disposed substantially in the region of said frusto-conical surface upon said force-fit insertion, said annular projections each having a triangular cross-section.

3. The underpinning defined in claim 1 or 2 wherein said recess has sharp edges.

4. The underpinning defined in claim 1 or 3 wherein the inner surface of said member is funnel-shaped at one end thereof to facilitate insertion of said cable into said member and to inhibit damage to said sheath upon bending of said cable at said underpinning.

* * * * *